United States Patent Office 3,780,093
Patented Dec. 18, 1973

3,780,093
PERFLUOROALKYL COMPOUNDS
Horst Jaeger, Bettingen, and Paul Schaefer, Riehen, Switzerland, assignors to Ciba-Geigy AG, Basel, Switzerland
No Drawing. Filed Aug. 17, 1971, Ser. No. 172,545
Claims priority, application Switzerland, Aug. 24, 1970, 12,591/70
Int. Cl. C07c 69/52
U.S. Cl. 260—486 H
2 Claims

ABSTRACT OF THE DISCLOSURE

Perfluoroalkyl compounds are provided in which the perfluoroalkyl radical is bonded through a linear or cyclic aliphatic radical to the carboxylic group of an aliphatic unsaturated carboxylic acid. These products and their polymerization products are useful for finishing various substrates, especially for the production of aliphatic finishes on paper, leather, non-wovens and textiles.

---

The subject of the invention are perfluoroalkyl compounds of the formula (1) 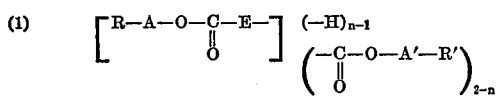

wherein R and R' each denote a perfluoroalkyl radical with 6 to 24 carbon atoms, A and A' each denote a radical of the formula

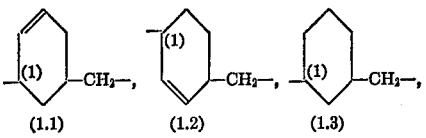

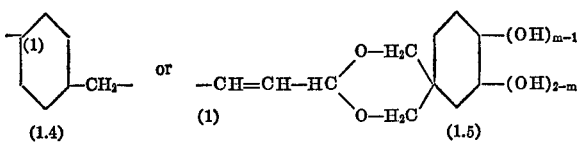

and, where $n=1$, each denote an acyclic alkylene radical with up to 12 carbon atoms which is bonded to R or R' by the carbon atom (1), E denotes an alkylene radical with 2 or 3 carbon atoms, and $m$ and $n$ each denote 1 or 2.

The acyclic alkylene radical for example corresponds to the formula

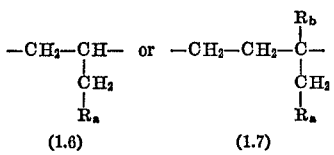

and preferably

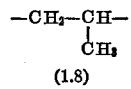

wherein $R_a$ and $R_b$ denote a hydrogen atom or an alkyl radical with 1 to 4 carbon atoms.

Here, perfluoroalkyl compounds of the formula (2) 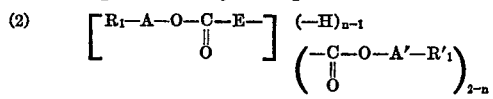

wherein $R_1$ and $R_1'$ each denote a perfluoroalkyl radical with 6 to 18 carbon atoms and A, A', E and $n$ have the indicated meaning, are of particular interest.

Amongst these perfluoroalkyl compounds, those of the formula (3) 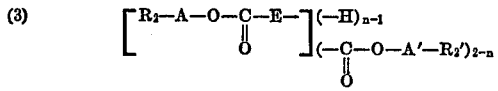

wherein $R_2$ and $R_2'$ each denote a perfluoroalkyl radical with 6 to 14 carbon atoms and A, A', E and $n$ have the indicated meaning, are preferred.

The perfluoroalkyl radicals R, R', $R_1$, $R_1'$, $R_2$ and $R_2'$ can be branched or, preferably, unbranched.

Other preferred perfluoroalkyl compounds correspond to the formula (4) 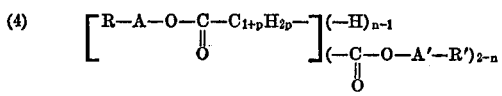

wherein $p$ is 1 or 2 and R, R', A, A' and $n$ have the indicated meaning.

The alkylene radical E or the radical of the formula $-C_{1+p}H_{2p}-$ are radicals which are, for example, derived from acrylic, methacrylic, crotonic, vinylacetic, maleic, fumaric, itaconic or citraconic acid, that is to say, for example, radicals of the formula (5.1)                                           —CH=CH—

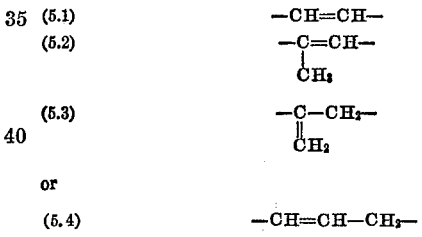

or (5.4)                                    —CH=CH—CH₃—

Accordingly, very suitable perfluoroalkyl compounds correspond to the formula (6) 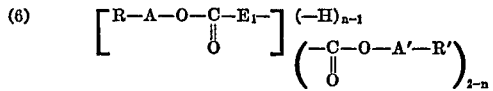

wherein $E_1$ represents a radical of the formulae 5.1, 5.2 or 5.3 and R, R', A, A' and $n$ have the indicated meaning.

Depending on whether $n$ is 1 or 2, the compounds of the Formulae 1 to 4 and 6 are dicarboxylic acid esters or monocarboxylic acid esters or diperfluoroalkyl compounds or monoperfluoroalkyl compounds.

In the Formulae 1 to 4 and 6, $n$ is preferably 2. Preferred compounds of this nature correspond to the formula (7) 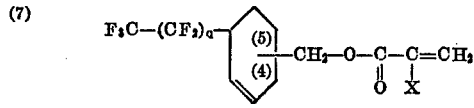

or (8)

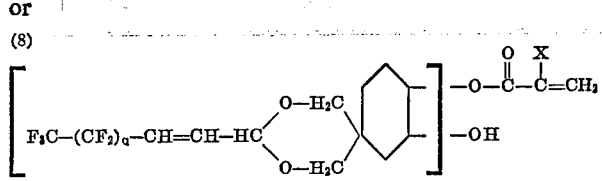

wherein $q$ denotes an integer from 5 to 13 and X denotes hydrogen or methyl, the ester radical in the Formula 7 being in the 4- or 5-position of the 6-membered ring.

Suitable perfluoroalkyl compounds correspond to the formula (9)

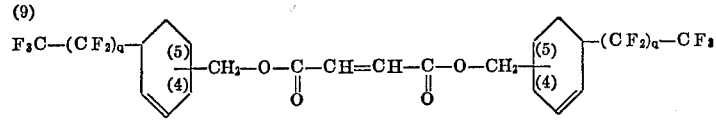

wherein $q$ is an integer from 5 to 13 and the ester radical is in the 4- or 5-position of the 6-membered rings.

Particularly interesting perfluoroalkyl compound correspond to the formulae (10)

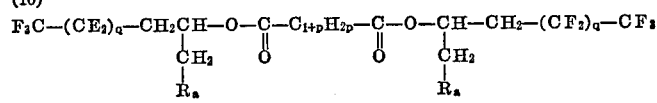

(11)

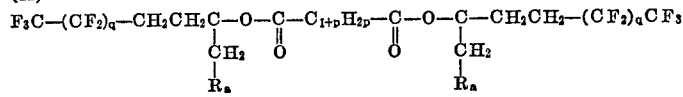

and preferably (12)

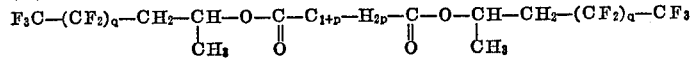

wherein $R_a$, $R_b$, $p$ and $q$ have the indicated meaning.

The perfluoroalkyl compounds of the Formula 1 are frequently in the form of isomer mixtures, since they are derived from perfluoroalkyl iodide-olefine adducts, wherein the perfluoroalkyl radical can add either to the α- or to the β-carbon atom of the olefinic double bond. For reasons of simplicity, only the one isomer form is frequently mentioned in the present text, for example

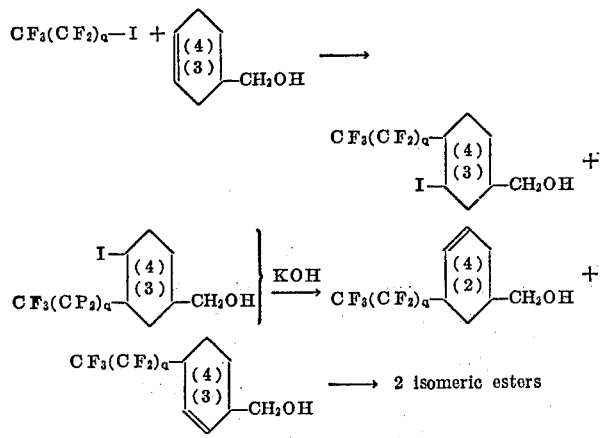

If, during the reaction of the perfluoroalkyl iodides with the olefines, a rearrangement of the double bonds can also occur, further isomers are obtained.

The perfluoroalkyl compounds of the Formula 1 can be manufactured according to methods which are in themselves known. However, the following two methods have proved the most appropriate:

A first process is characterized in that at least one compound of the formula (13)

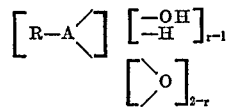

is reacted with a carboxylic acid of the formula (14)

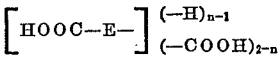

or an anhydride, acid halide or lower alkyl ester thereof, R, A, E and $n$ having the indicated meaning and $r$ being 1 or 2.

Preferably, this reaction is carried out in the presence of an organic solvent and optionally in the presence of an acid catalyst.

The preferred temperature for this reaction is 20 to 150° C.

Starting products of the Formula 14 for this reaction are, for example, acrylic, methacrylic, crotonic, maleic, fumaric or itaconic acid. Starting products of Formula 13 correspond, for example, to the formula (15.1)

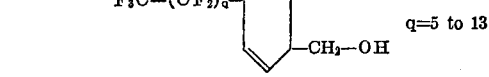

or (15.2)

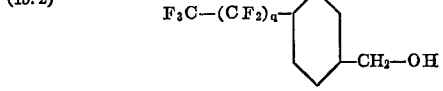

or its isomers.

A second process for the manufacture of perfluoroalkyl compounds of Formula 1, wherein A or A' each represent a radical of the Formula 1.1, 1.2 or 1.4 and $m$ is 1 or 2 is characterized in that hydrogen iodide is split off, in the presence of a base, from a compound of the formula (16)

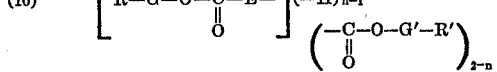

wherein G and G' each represent a radical of the formula (16.1)

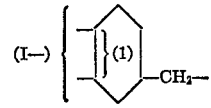

(16.2)

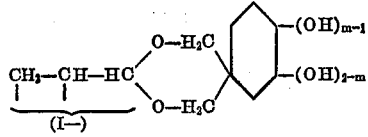

and $m$, $n$, R, R' and E have the indicated meaning.

This process, again, is preferably carried out in the presence of an organic solvent.

The most advantageous temperature for this elimination of hydrogen iodide is 20 to 150° C.

The saturated starting substances for the first process are obtained by a hydrogenating deiodination.

This deiodination with "nascent" hydrogen takes place in accordance with the equation

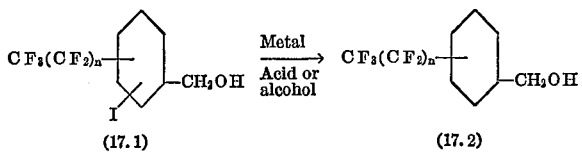

Possible acids are inorganic acids such as hydrochloric or sulphuric acid, or organic acids such as acetic acid. Methanol or ethanol is preferably used as the alcohol.

The alcohols thus obtained can be esterified to give compounds of the Formula 1.

The elimination of the iodine can be effected by catalytic hydrogenation, in which case Raney nickel, platinum or palladium may be mentioned as catalysts. This elimination is appropriately carried out in the presence of an organic acid, such as acetic acid, or of an alkanol, such as ethanol.

The organic solvents preferentially used for these two processes are solvents which are inert, that is to say do not participate in the reaction, such as, for example: benzene, toluene and ethyl acetate for the esterification reaction. Alkanols such as methanol, ethanol or propanol are used for the elimination of hydrogen iodide.

In the case of the elimination of hydrogen iodide by means of organic bases such as triethylamine, the base itself can serve as the solvent.

Perfluoroalkyl compounds of the type of the compounds of the Formula 12 are manufactured by esterification of the corresponding 2-perfluoroalkyl-isopropanol (obtained from the corresponding iodide) with a carboxylic acid of the Formula 14, in accordance with customary methods.

As a result of their alkenyl group the perfluoroalkyl compounds of the Formula 1 can be homopolymerized, or copolymerized with other ethylenically unsaturated copolymerizable compounds.

The polymerization of the monomeric perfluoroalkyl compounds can be carried out in solution or in emulsion and in the presence of catalysts which release free radicals or act by an ionic mechanism, the compounds being polymerized with themselves, with other perfluoroalkyl compounds according to the invention or with other polymerizable compounds to give linear polymers.

The following are suitable for copolymerization with the perfluoroalkylmonocarboxylic acid esters:

(a) Vinyl esters of organic carboxylic acids, for example vinyl acetate, vinyl formate, vinyl butyrate and vinyl benzoate, (b) Vinyl alkyl ketones and vinyl alkyl ethers such as vinyl methyl ketone and vinyl butyl ether, (c) Vinyl halides, such as vinyl chloride, vinyl fluoride and vinylidene chloride, (d) Vinylaryl compounds, such as styrene and substituted styrenes, (e) Derivatives of the acrylic acid series, such as acrylonitrile or acrylamide and preferably its derivatives which are substituted at the amide nitrogen, such as N-methylolacrylamide, N - methylolacrylamide-alkyl ether, N,N - dihydroxyethylacrylamide, N-tert.-butylacrylamide and triacrylyl-hexahydrotriazine, (f) Esters of the acrylic acid series, such as esters of acrylic acid, methacrylic acid, α-chloroacrylic acid, crotonic acid, maleic acid, fumaric acid or itaconic acid and monoalcohols or dialcohols with 1 to 18 carbon atoms or phenols, for example ethyl acrylate, glycidyl acrylate, butyl acrylate, acrylic acid monoglycol ester of dodecyl acrylate, and (g) Polymerizable olefines such as isobutylene, butadiene or 2-chlorobutadiene.

Preferably, the following are used: esters, amides or methylolamides of acrylic acid or methacrylic acid, such as acrylic acid ethyl ester, acrylic acid butyl ester, acrylic acid glycidyl ester, glycol monoacrylate or calcium acrylate, acrylamide, methyl methacrylate, methyl acrylate, acrylamide, methacrylamide, N-methylolacrylamide, N-methylolacrylamidemethyl ether and N-tert.-butylacrylamide; vinyl esters of organic carboxylic acids such as vinyl acetate; styrene, vinyl halides such as vinyl chloride or vinylidene chloride, or polymerizable olefines such as isobutylene.

The polymers as a rule consist of 5 to 100 percent by weight of a perfluoroalkyl compound and of 95 to 0 percent by weight of a different compound. Polymers which contain 5 to 30, preferably 8 to 20, percent by weight of copolymerized monomeric perfluoroalkyl compound, relative to the total weight of the monomer units, possess particularly interesting technical properties. Amongst these polymers, in turn, the binary or ternary copolymers which in addition to 5 to 30 percent by weight of the perfluoroalkyl compound also contain a copolymerized acrylic acid ester, such as butylacrylate and optionally a copolymerized third monomer, especially a vinyl ester, such as vinyl acetate, are in turn distinguished by particularly advantageous technical properties, especially in the field of textile finishing.

The manufacture of the polymers by homopolymerization or copolymerization of the perfluoroalkyl compounds with one or more other copolymerizable ethylenically unsaturated monomers is carried out according to customary methods, for example by block polymerization, bead polymerization, graft polymerization or polymerization in aqueous emulsion, or preferably by solvent polymerization in an organic solvent suitable for this purpose, such as, for example, acetone, benzene, sym.-dichloroethane or ethyl acetate.

The polymerization is appropriately carried out with warming, preferably to the boiling point of the solvent, and with addition of ionic catalysts or of peroxidic or other catalysts which form free radicals and which are soluble in the reaction medium such as, for example, benzoyl peroxide, lauroyl peroxide or α,α'-azoisobutyrodinitrile.

Depending on the nature of the polymerization conditions and on the monomeric starting substances used, the polymeric compounds are obtained in the form of viscous solutions of granules or of emulsions.

It is furthermore also possible to carry out the polymerization of the monomeric compounds in the presence of substrates. It can, for example, be effected on glassfibre fabric or textile material. In this case, a suitable method is to impregnate the substrate in question with solutions or emulsions of the monomers and subsequently to carry out the polymerization by heating the material, a polymerization catalyst being added.

The monomeric perfluoroalkyl compounds and their polymers are advantageously used together with compounds which contain several reactive functional groups, such as 1,2-epoxy groups, isocyanate groups, acrylyl groups, methylol groups, methylol groups etherified with lower alcohols, aldehyde groups, easily hydrolyzable ester groups and the like. Such polyfunctional compounds are also suitable for use as crosslinking components, or curing or fixing components, for the copolymers according to the invention where these contain, for example, free hydroxy groups.

As such components there may in particular be mentioned: epoxide compounds, namely polyglycidyl ethers, such as butanediol diglycidyl ether and diglycidyl ether, diisocyanates and polyisocyanates, such as o-, m- and p-phenylenediisocyanate, toluylene-2,4-diisocyanate and 1,5-naphthylenediisocyanate; acrylyl compounds such as methylene-bis-acrylamide and symmetrical triacrylylperhydrotriazine; poly(2,3-dihydro-1,4-pyranyl) compounds, such as (2,3-dihydro-1',4'-pyran-2'-yl)-methyl ester; aldehydes, such as formaldehyde or glyoxal, and soluble phenol-formaldehyde condensation products such as novolacs or resols. Preferably, aminoplasts which are soluble in water or in organic solvents are used as crosslinking components. Possible aminoplasts are formaldehyde condensation products of urea, thiourea, guanidine, acetylenediurea and dicyandiamide, and also of aminotriazines, such as of melamine or of guanamines, such as acetoguanamine, benzoguanamine, tetrahydrobenzoguanamine or formoguanamine as well as their ethers with alcohols, such as methyl alcohol, ethyl alcohol, propyl alcohol, allyl alcohol, butyl alcohol, amyl alcohol, hexyl alcohol, cyclohexanol, benzyl alcohol, lauryl alcohol, stearyl alcohol, oleyl alcohol or abietyl alcohol. In addition to the ether radicals, the condensation products can also contain radicals of higher-molecular acids, such as, for example stearic acid.

Particularly good technical results in the field of textile finishing are obtained on using water-soluble condensation products of formaldehyde and melamine or especially on using the esterification or etherification product of hexamethylolmelamine-methyl ether and stearic acid or stearyl alcohol, as crosslinking or fixing components.

The homopolymers and copolymers of the perfluoroalkyl compounds can also be used mixed with polymers not containing fluorine. Very suitable polymers not containing fluorine are here, for example, the homopolymers of acrylic acid esters or methacrylic acid esters, such as poly(ethyl acrylate) or copolymers of acrylic acid esters or methacrylic acid esters with methylolacrylamide or methylolmethacrylamide.

The perfluoroalkyl compounds of the Formula 1 can be used, either as such or as homopolymers or copolymers, for the finishing of porous substrates, preferably for the production of oleophobic finishes thereof. Paper, leather, non-wovens or, especially, fibre materials such as textiles may be mentioned as porous substrates.

To render them oleophobic, the substrates can be treated either with solutions or with dispersions or emulsions of the monomeric or polymeric perfluoro compounds. The monomers can, for example, be applied to the textile material from a solution with an organic solvent and can be thermally fixed to the fabric after evaporation of the solvent. Polymers can also be applied to the fabric from suitable solvents.

Possible textile materials which can preferably be treated with the monomeric or polymeric perfluoro compounds are, for example, those of native or regenerated cellulose, such as cotton, linen or rayon, staple viscose or cellulose acetate. However, textiles of wool, synthetic polyamides, polyesters or polyacrylonitrile can also be used. Mixed woven fabrics or mixed knitted fabrics of cotton-polyester fibres can also be finished advantageously. In these cases the textiles can be in the form of filaments, fibres or flocks, but preferably in the form of woven fabrics or knitted fabrics.

Preparations which contain the monomeric or polymeric perfluoro compounds can be applied to the substrate in the usual manner which is in itself known. Woven fabrics can for example be impregnated by the exhaustion process or on a padder which is charged with the preparation at room temperature. The impregnated material is thereafter dried, preferably at 60 to 120° C., and subsequently optionally still subjected to a heat treatment at above 100° C., for example at 120 to 200° C.

Preparations which in addition to the monomeric or polymeric perfluoroalkyl compounds also contain components with properties imparting a hydrophobic character, for example solutions or emulsions of fatty acid condensation products, for example with aminoplast precondensates or paraffin emulsions, produce an oil-repellent effect, coupled with a water-repellent effect, on the substrates treated therewith.

Furthermore, a so-called "soil release" and "anti-soiling" effect can also be achieved with the perfluoroalkyl compounds, especially the polymers, above all on cotton.

EXAMPLE 1

26.4 g. of a compound of the formula (101) 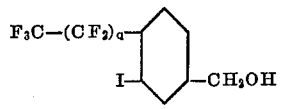

$q=5, 7, 9$ are treated, in a 200 ml. round flask, with 100 ml. of 50% strength potassium hydroxide solution and subjected to a steam distillation. 13.2 g. of a clear, colorless substance are obtained, which after distillation has a boiling point of 45 to 100° C. at 12 mm. Hg. The following compound is identified by recording a mass spectrum (102) 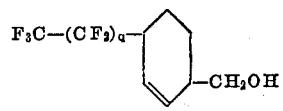

13 g. of the alcohol of the Formula 102 are dissolved in 100 ml. of absolute benzene. 2.2 g. of methacrylic acid, 0.5 g. of p-toluenesulphonic acid and 0.2 g. of hydroquinone-monomethyl ether are weighed out into this solution.

This reaction mixture is heated to 82° C. reflux temperature. After 3 hours' reaction time, no further separation of water is observable. The methacrylic acid ester is cooled to room temperature and the benzene solution is washed 3 times with 50 ml. of sodium bicarbonate solution until neutral, rinsed twice with 20 ml. of water, dried with sodium sulphate and concentrated in vacuo at 30° C. Yield: 13.1 g.=89.3% of theory of a liquid compound.

The structure is confirmed by recording a mass spectrum:

(103) 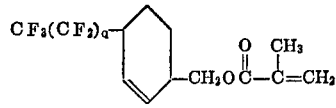

EXAMPLE 2

37 g. of an epoxide of the formula (104) 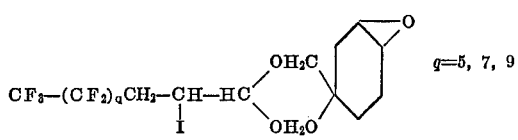

$q=5, 7, 9$ are dissolved in 50 ml. of ethyl acetate. 1 g. of sodium acetate and 0.2 g. of hydroquinone-monomethyl ether are weighed out into this solution and the mixture is heated to the reflux temperature (75° C.). 4 g. of acrylic acid dissolved in 20 ml. of ethyl acetate are added dropwise at the reflux temperature and the mixture is allowed to react for 5 hours. The ethyl acetate is then removed in vacuo at 30° C., the residue is taken up in 200 ml. of diethyl ether and the solution is washed 3 times with 20 ml. of water, the neutral ethereal solution is dried with sodium sulphate and the ether is removed in vacuo. Yield: 36.5 g.=89.6% of theory, of a pale yellowish, viscous liquid.

The structure is confirmed by recording a mass spectrum.

(105)
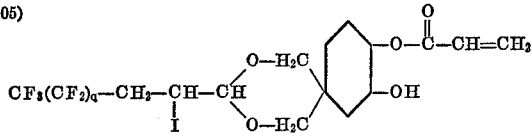

22 g. of the compound of the Formula 105 are dissolved in 50 ml. of triethylamine and stabilized with 0.5 g. of hydroquinone-monomethyl ether.

This mixture is kept for 3 hours at the reflux temperature at 55° C. The excess triethylamine is then distilled off under normal pressure and the residual amount of triethylamine is subsequently removed in vacuo. The residue is taken up in 100 ml. of diethyl ether, washed with 3 times 20 ml. of water until neutral and dried with sodium sulphate, and the ether is distilled off. The residue is a highly viscous, light brown substance. Yield: 15.5 g.=83.7% of theory.

The structure is confirmed after recording a mass spectrum (106)
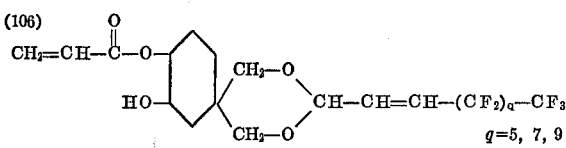

In contrast to the spectrum of the substance of the Formula 104, no iodine is detected by mass spectroscopy in this case.

EXAMPLE 3

(a) 30 g. of the perfluoroalkylisopropyl alcohol of the formula (107.1)   $CF_3(CF_2)_nCH_2CH-OH$
                         $|$
                         $CH_3$   $n=5, 7, 9$ are dissolved in 200 ml. of (anhydrous) benzotrifluoride. 0.05 g. of methoxyhydroquinone and 4.8 g. of fumaric acid dichloride are added to this solution.

The reaction solution is heated to the reflux temperature (102° C.). A vigorous evolution of hydrogen chloride gas commences. After 18 hours the reaction is completed. To work up the reaction mixture, the solution is diluted with 200 ml. of diethyl ether, washed 3 times with 100 ml. at a time of a sodium bicarbonate solution and twice with water and subsequently dried over sodium sulphate. The solvent is then removed in vacuo. Yield: 29.9 g.=60.5% of theory of a solid green-brown substance.

The mass spectrum confirms the following structure of the reaction product:

(107.2)
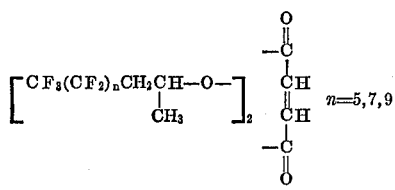

(b) If the fumaric acid dichloride is replaced by the corresponding dichloride of itaconic acid, a mixture of the symmetrical diester and the asymmetrical monoester is obtained, as was confirmed by the mass spectrum:

(108)
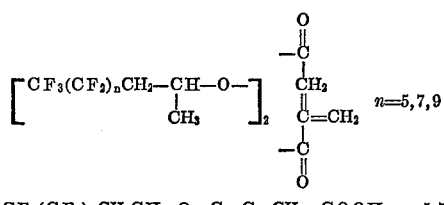

(109)   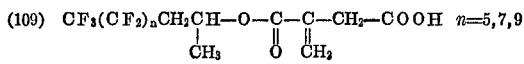

EXAMPLE 4

Half of a mixture of 68 g. of water, 0.32 g. of sodium laurylsulphonate, 14 g. of acetone, 0.8 g. of acrylamide and 19.2 g. of the compound of the Formula 103 is treated with 0.8 g. of 35% strength hydrogen peroxide, a solution of 0.4 g. of ascorbic acid in 6.5 g. of water and 0.4 g. of an 0.1% strength aqueous solution of ferrous ammonium sulphate at 20° C., whilst stirring and passing nitrogen over the mixture. Thereafter the second half of the mixture is mixed with 0.8 g. of 35% strength hydrogen peroxide and introduced into the polymerization vessel over the course of 30 minutes. A solution of 0.4 g. of ascorbic acid in 6.5 g. of water is simultaneously but separately added dropwise. 20 minutes later 1.2 g., and 120 minutes thereafter 2.4 g., of an 0.1% strength aqueous solution of ferrous ammonium sulphate are added. The mixture is allowed to complete polymerization for 24 hours at room temperature, and about 120 g. of a finely disperse 16% strength emulsion, which leaves a clear, colorless film, are obtained.

EXAMPLE 5

A solution of 0.3 g. of azodiisobutyronitrile in 3 g. of acetone is added to a solution of 28.8 g. of the compound of the Formula 103 and 1.2 g. of N-methylol-methacrylamide-methy ether in 45 g. of acetone. The reaction mixture is warmed to 58° C. under a nitrogen atmosphere, whilst stirring. At intervals of 2 hours, solutions of 0.3 g. of azodiisobutyronitrile in 3 g. of acetone are added three times. After 30 hours' reaction time, the solvent is distilled off the partially precipitated polymer. The residue is taken up in trifluoromethylbenzene and a 50% strength solution is produced.

(b) Instead of the compound of the Formula 103, the compound of the Formula 106 can also be employed in the polymerization reaction described. A copoymer which is soluble in acetone, forms a clear smooth film, and can be applied from acetone solution, is obtained.

EXAMPLE 6

A solution of 12 g. of the compound of the Formula 107.2, 1.35 g. of vinyl acetate and 1.65 g. of styrene in 11 g. of trifluoromethylbenzene is warmed to 50° C. under a nitrogen atmosphere, whilst stirring. 0.2 g. of lauroyl peroxide in 3 g. of trifluoromethylbenzene is added to this reaction mixture. After 2 hours the temperature is raised to 60° C. Solutions of 0.2 g. of lauroyl peroxide in 3 g. of trifluoromethylbenzene are twice added, at intervals of 3 hours. After about 10 hours, the polymerization is complete. A clear solution of film-forming copolymer is obtained.

EXAMPLE 7

The 16% strength emulsion from Example 3 is diluted with water to 4% solids content. Cotton poplin strips are dipped into this emulsion, squeezed out and dried for 5 minutes at 140° C. in a drying cabinet in vacuo.

The oil-repellent effect is assessed according to the so-called "3 M oil repellency test" (Crajeck and Petersen, Textile Research Journal 32, 320–331 (1960)) in heptane-Nujol mixtures. In the assessment, 150 is the best achievable rating. The individual samples are assessed immediately after drying, that is to say as obtained, and after an SNV-4 wash (=machine wash for 30 minutes at 95° C., using a liquor ratio of 1:50, in a bath which contains 5 g. of soap and 2 g. of calcined sodium carbonate and a total of 10 steel balls per litre). The results are as follows:

| Cotton: | Rating: |
|---|---|
| As obtained | 120 |
| After 1× SNV-4 | 90–100 |

EXAMPLE 8

The monomers from Examples 1, 2, 3a and 3b, and the polymers from Examples 5a, 5b and 6 are applied to cotton poplin strips in accordance with Example 7, and post-treated.

The table which follows contains the composition of the preparations used and the results of the assessment of the oil-repellent effect.

| Preparation from Example | 1 | 2 | 3a | 3a | 3b | 5a | 5b | 6 |
|---|---|---|---|---|---|---|---|---|
| Acetone | 1,000 | 1,000 | | | | | 1,000 | |
| Ethanol | | | 1,000 | 1,000 | 1,000 | | | |
| Benzotrifluoride | | | | | | 1,000 | | |
| Concentration of the preparation (g./l.) | 10 | 15 | 4 | 8 | 8 | 30 | 35 | 30 |
| Oil-repellent effect: | | | | | | | | |
| As obtained | 100 | 120 | 110 | 110 | 100 | 100 | 80 | 100 |
| 1× SNV-4 | 90 | 100 | | | | 90 | 70 | 100 |
| 1× dry cleaning | | | 110 | 100 | 100 | | | |

What is claimed is:

1. A perfluoroalkyl compound of the formula:

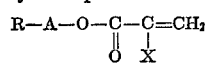

wherein R is perfluoroalkyl radical of 6 to 24 carbon atoms,

A is 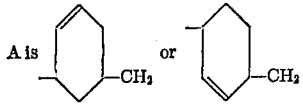

and X is hydrogen or methyl.

2. A perfluoroalkyl compound according to claim 1 wherein R is a perfluoroalkyl radical of 6 to 14 carbon atoms.

References Cited

UNITED STATES PATENTS 3,660,360  5/1972  Chandhuri et al. ---- 260—78.5
3,607,909  9/1971  Beregi et al. ------ 260—486 H LORRAINE A. WEINBERGER, Primary Examiner
PAUL J. KILLOS, Assistant Examiner U.S. Cl. X.R.

117—140, 141, 142, 155; 260—78.5 BB, 80.73, 80.78, 86.1 R, 340.7, 485 F, 617 R